(12) United States Patent
Mataga

(10) Patent No.: US 8,006,385 B2
(45) Date of Patent: Aug. 30, 2011

(54) FORMING METHOD OF TOOTH TRACE OF GEAR

(75) Inventor: Akira Mataga, Toyohashi (JP)

(73) Assignee: Musashi Seimitsu Kogyo Kabushiki Kaisha, Aichi-Ken (JP)

( * ) Notice: Subject to any disclaimer, the term of this patent is extended or adjusted under 35 U.S.C. 154(b) by 1500 days.

(21) Appl. No.: 11/179,917

(22) Filed: Jul. 12, 2005

(65) Prior Publication Data

US 2006/0021225 A1 Feb. 2, 2006

(30) Foreign Application Priority Data

Jul. 28, 2004 (JP) ................................. 2004-220654

(51) Int. Cl.
*B21K 1/30* (2006.01)

(52) U.S. Cl. ... 29/893.3; 29/893.35; 29/893; 72/342.94; 219/121.73

(58) Field of Classification Search .................. 29/893.3, 29/893, 893.35; 72/342.1, 342.5, 342.94, 72/342.96; 219/153, 121.73
See application file for complete search history.

(56) References Cited

U.S. PATENT DOCUMENTS

| | | | | |
|---|---|---|---|---|
| 3,550,418 A | * | 12/1970 | McLeod | 72/192 |
| 4,120,187 A | * | 10/1978 | Mullen | 72/342.6 |
| 4,308,760 A | * | 1/1982 | Voigtlander et al. | 74/459.5 |
| 5,228,324 A | * | 7/1993 | Frackiewicz et al. | 72/342.1 |
| 5,266,769 A | * | 11/1993 | Deshpande et al. | 219/121.69 |
| 5,719,374 A | * | 2/1998 | Frackiewicz et al. | 219/121.66 |
| 6,251,328 B1 | * | 6/2001 | Beyer et al. | 264/400 |
| 6,410,884 B1 | * | 6/2002 | Hackel et al. | 219/121.85 |
| 6,415,639 B1 | * | 7/2002 | Kilian et al. | 72/342.1 |
| 6,640,604 B2 | * | 11/2003 | Matsushita | 72/342.1 |
| 6,670,578 B2 | * | 12/2003 | Hackel et al. | 219/121.85 |
| 6,865,798 B2 | * | 3/2005 | Fukuroi | 29/603.07 |
| 7,185,417 B2 | * | 3/2007 | Fukuroi | 29/603.16 |
| 7,392,580 B2 | * | 7/2008 | Fukuroi et al. | 29/603.16 |

FOREIGN PATENT DOCUMENTS

| | | |
|---|---|---|
| JP | 2-228427 A | 9/1990 |
| JP | 2002-129239 A | 5/2002 |
| JP | 2003-071632 A | 3/2003 |

OTHER PUBLICATIONS

Machine English translation of JP 2003-071632 A.*
espacenet English abstract of JP 2003-71632 A.
espacenet English abstract of JP 2002-129239 A.
espacenet English abstract of JP 2-228427 A.
espacenet English abstract of JP 2003-071632 A.

* cited by examiner

*Primary Examiner* — Essama Omgba
(74) *Attorney, Agent, or Firm* — Ladas & Parry LLP

(57) ABSTRACT

A forming method of a tooth trace of a gear according to the present invention includes: a first step of preparing a preformed gear made of metal including a cylindrical main body and a tooth part having a flat tooth flank having a uniform thickness in a tooth trace direction inside of the main body; and a second step of conducting a surface treatment locally to an outside surface of the main body in order to deform the outside surface of the main body in such a manner that the same becomes concave, so that a crowning bulging in the tooth trace direction is formed on the tooth flank of the tooth part.

12 Claims, 8 Drawing Sheets

FORMING METHOD OF TOOTH TRACE OF GEAR

FIELD OF THE INVENTION

This invention relates to a forming method of a tooth trace of a gear.

BACKGROUND ART

Conventionally, as a general forming method of a tooth part of an internal gear, a mechanical machining method using a cutting unit having a cutter is known. A forming method of a tooth part using a cutting unit is explained with reference to FIG. 9.

The cutting unit 101 shown in FIG. 9 is a cutting unit for conducting a cutting process to a preformed gear, which is cylindrical and which has a small opening at an end and a large opening at the other end. The cutting unit 101 consists of a cutting tool 109 and a holding tool 110. The cutting tool 109 consists of a cutter 102 having a cutting tooth part 103, and a holder 104 holding the cutter 102 and movable forward and backward with respect to the preformed gear. The holding tool 110 has a receiving jig 105 arranged opposite to the cutting tool 109, and a plurality of chuck members 108. The receiving jig 105 has a first receiving part 106 having an outside diameter that is substantially the same as an inside diameter of the large opening of the preformed gear, and a second receiving part 107 extending outward in the radial direction serially from the first receiving part 106.

The cutting unit 101 is used to form a tooth part of an internal gear. Concretely, at first, the large-opening side of the preformed gear is inserted into the first receiving part 106 of the receiving jig 105. Then, the end surface of the large opening is brought into contact with the second receiving part 107, so that the preformed gear is placed on the receiving jig 105. After that, the chuck members 108 hold the end surface of the small opening of the preformed gear. Then, the cutter 102 integrated with the holder 104 is moved toward the preformed gear, so that the cutter 102 is brought into contact with the inside surface of the preformed gear. Thus, the cutting process by means of the cutter 102 is started, and then the tooth part 153a is formed.

Herein, in general, for a gear, it is preferable to form a crowning on a tooth flank of a tooth part of the gear, in order to inhibit abnormal sound generation and to improve contact manner of the tooth flank.

However, in the cutter 102 of the cutting unit 101 as described above, it is difficult to control minute movement thereof. Thus, it is difficult to form a crowning on the tooth part 153a. Then, in order to form a crowning on the tooth part 153a of the internal gear, after the tooth part 153a is formed by the cutting unit 101, the tooth trace of the tooth part 153a is adjusted by another grinding process to form the crowning on the tooth flank.

SUMMARY OF THE INVENTION

In the method of forming a crowning as described above, there are problems in increase of machining processes and in increase of cost. The object of the present invention is to provide a method of forming a crowning on a tooth flank with less machining processes at less cost.

This invention is a forming method of a tooth trace of a gear comprising: a first step of preparing a preformed gear made of metal including a cylindrical main body and a tooth part having a flat tooth flank having a uniform thickness in a tooth trace direction inside the main body; and a second step of conducting a surface treatment locally to an outside surface of the main body in order to deform the outside surface of the main body in such a manner that the same becomes concave, so that a crowning bulging in the tooth trace direction is formed on the tooth flank of the tooth part.

According to the invention, the surface treatment (surface modification) is conducted locally to the outside surface of the main body so as to generate distortion locally, so that the outside surface of the main body is deformed to be concave in the tooth trace direction and a crowning bulging in the tooth trace direction may be formed on the tooth flank of the tooth part on the opposite side (inside surface). Thus, the crowning may be easily formed on the tooth flank of the tooth part of the internal gear.

In addition, even when gears of different sizes are formed, it is sufficient only to change a receiving jig or the like. That is, flexibility of a gear forming unit is increased. That is, by means of the same surface-treatment unit, it is possible to form gears of different sizes.

In addition, if the portion to undergo the surface treatment is changed, the portion to be dented in the tooth trace direction on the outside surface of the main body may be changed accordingly. Thus, a desired shape may be easily formed on the tooth flank of the tooth part.

In addition, if condition of the surface treatment such as an extent or a depth is changed, an extent, a shape or the like of a cavity formed on the outside surface of the main body may be changed accordingly. Thus, a crowning of various shapes and/or dimensions may be easily formed on the tooth flank of the tooth part.

Preferably, in the second step, the surface treatment is adapted to be conducted to a portion of the outside surface of the main body corresponding to a central portion in the tooth trace direction of the tooth part. In the case, a crowning bulging at a central portion in the tooth trace direction may be easily formed on the tooth flank of the tooth part.

For example, the surface treatment may be conducted by using a laser beam. Alternatively, the surface treatment may be conducted by using an electron beam. Alternatively, the surface treatment may be conducted by an induction hardening process. Alternatively, the surface treatment may be conducted by a shot peening process.

In addition, the concept of the present invention can be applied to an external gear as well as the internal gear. That is, the present invention is a forming method of a tooth trace of a gear comprising: a first step of preparing a preformed gear made of metal including a cylindrical main body and a tooth part having a flat tooth flank having a uniform thickness in a tooth trace direction outside the main body; and a second step of conducting a surface treatment locally to an inside surface of the main body in order to deform the inside surface of the main body in such a manner that the same becomes concave, so that a crowning bulging in the tooth trace direction is formed on the tooth flank of the tooth part.

According to the invention, the surface treatment (surface modification) is conducted locally to the inside surface of the main body so as to generate distortion locally, so that the inside surface of the main body is deformed to be concave in the tooth trace direction and a crowning bulging in the tooth trace direction may be formed on the tooth flank of the tooth part on the opposite side (outside surface). Thus, the crowning may be easily formed on the tooth flank of the tooth part of the external gear.

Even when external gears of different sizes are formed, it is sufficient only to change a receiving jig or the like. That is, by means of the same surface-treatment unit, it is possible to form external gears of different sizes.

In addition, if the portion to undergo the surface treatment is changed, the portion to be dented in the tooth trace direction on the inside surface of the main body may be changed accordingly. Thus, a desired shape may be easily formed on the tooth flank of the tooth part.

In addition, if condition of the surface treatment such as an extent or a depth is changed, an extent, a shape or the like of a cavity formed on the inside surface of the main body may be changed accordingly. Thus, a crowning of various shapes and/or dimensions may be easily formed on the tooth flank of the tooth part.

Preferably, in the second step, the surface treatment is adapted to be conducted to a portion of the inside surface of the main body corresponding to a central portion in the tooth trace direction of the tooth part. In the case, a crowning bulging at the central portion in the tooth trace direction may be easily formed on the tooth flank of the tooth part.

In a case of an external gear as well, for example, the surface treatment may be conducted by using a laser beam. Alternatively, the surface treatment may be conducted by using an electron beam. Alternatively, the surface treatment may be conducted by an induction hardening process. Alternatively, the surface treatment may be conducted by a shot peening process.

DESCRIPTION OF THE PREFERRED EMBODIMENT

A forming method of an internal gear according to an embodiment of the present invention is explained based on FIGS. 1 to 5.

Figure 1:
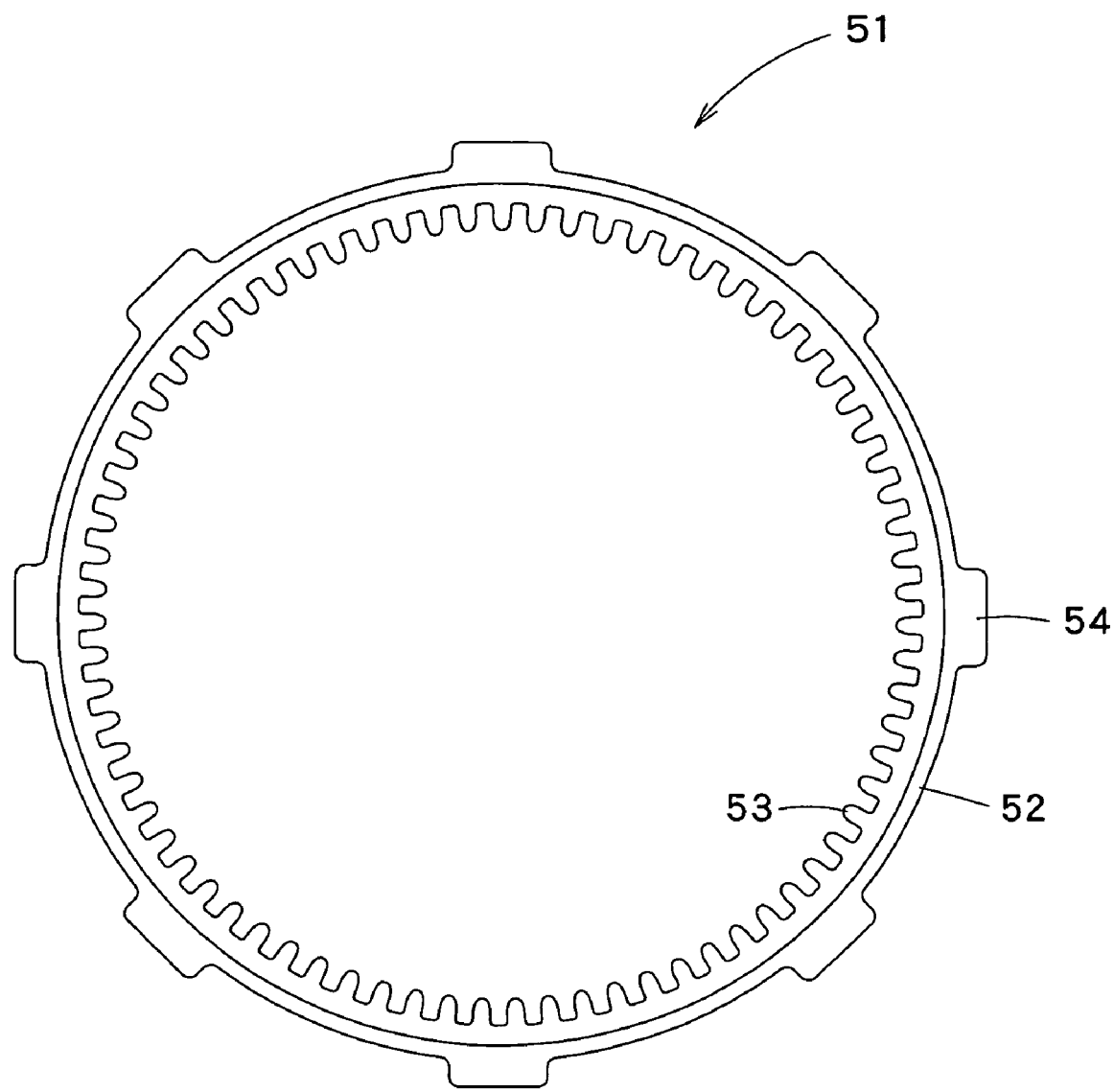
FIG. 1 is a plan view of an internal gear.

FIG. 1 is a plan view of an internal gear 51 having a tooth trace formed by the embodiment of the invention on a tooth flank of a tooth part 53 thereof. The internal gear 51 has a cylindrical main body 52, which has a small opening 55 at one end and a large opening 56 at the other end. A plurality of projections 54 are formed at predetermined intervals on the outside periphery of the large opening 56 of the main body 52. The tooth part 53 is a straight tooth part, and formed inside the main body 52. In the tooth part 53, as shown in FIG. 2B, a central portion of the tooth part 53 in the tooth trace direction budges inwardly, that is, a circular arc crowning is formed.

The crowning on the tooth flank of the tooth part 53 of the internal gear 51 is formed by adjusting a flat tooth flank of a preformed gear, which is to be formed into the internal gear 51, in the tooth trace direction.

Figure 5:
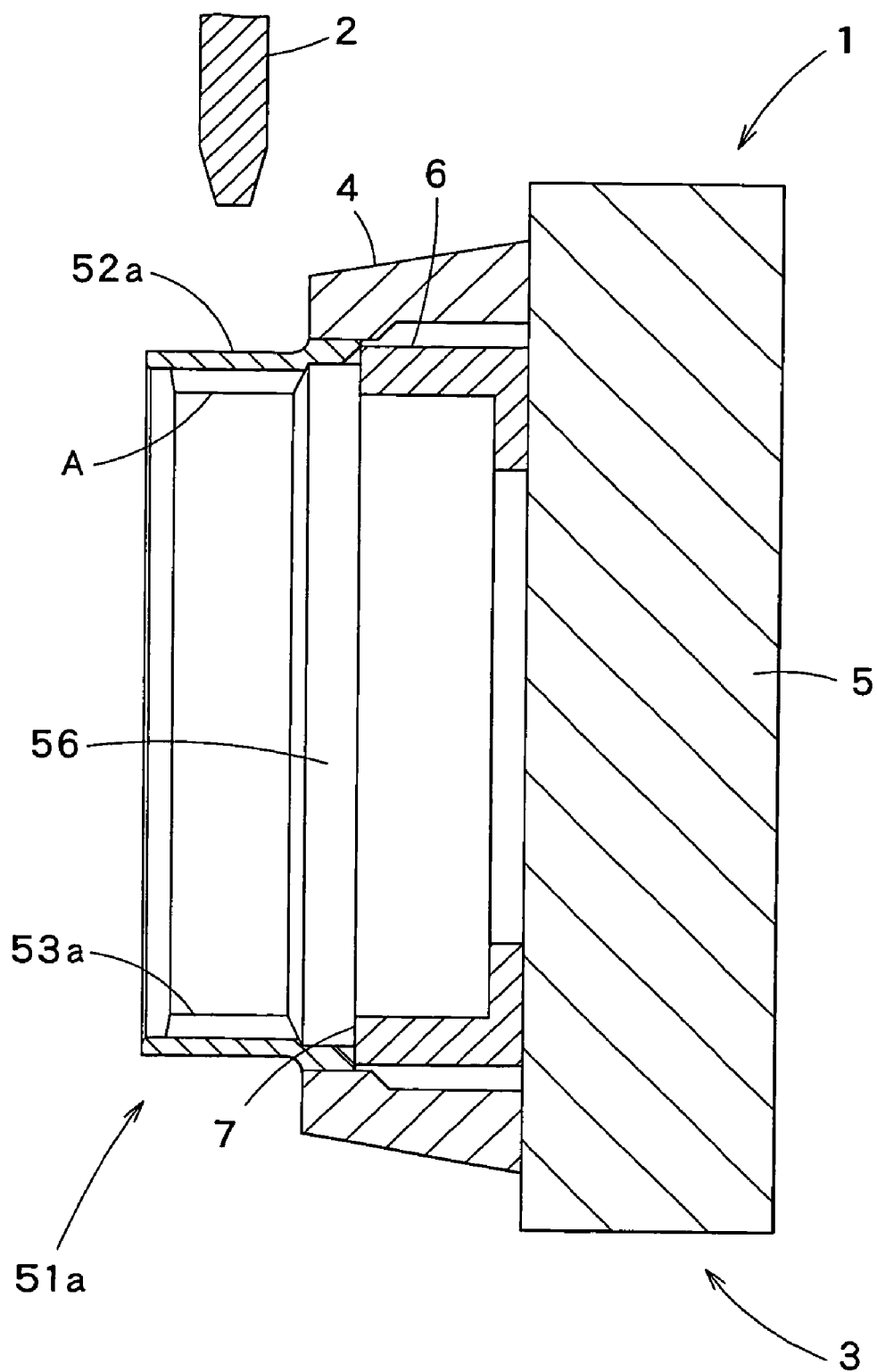
FIG. 5 is a partial sectional view showing a surface-treatment unit by means of an electron beam, used in the embodiment of the present invention.

In FIG. 5, a surface-treatment unit 1 used in the present embodiment is shown. The surface-treatment unit 1 has an electron-beam gun 2 and a holding tool 3 that can hold a work. The holding tool 3 has a plurality of chuck members 4, a chuck body 5 on which the chuck members 4 are mounted, and a positioning tool 6 arranged inside the chuck members 4. The positioning tool 6 has a contact end 7 opposite to the chuck body 5, for positioning the work.

A method of forming (adjusting) the tooth flank(s) of the tooth part(s) 53 of the internal gear 51 by using the surface treatment unit 1 is explained with reference to FIG. 5.

Figure 2A:
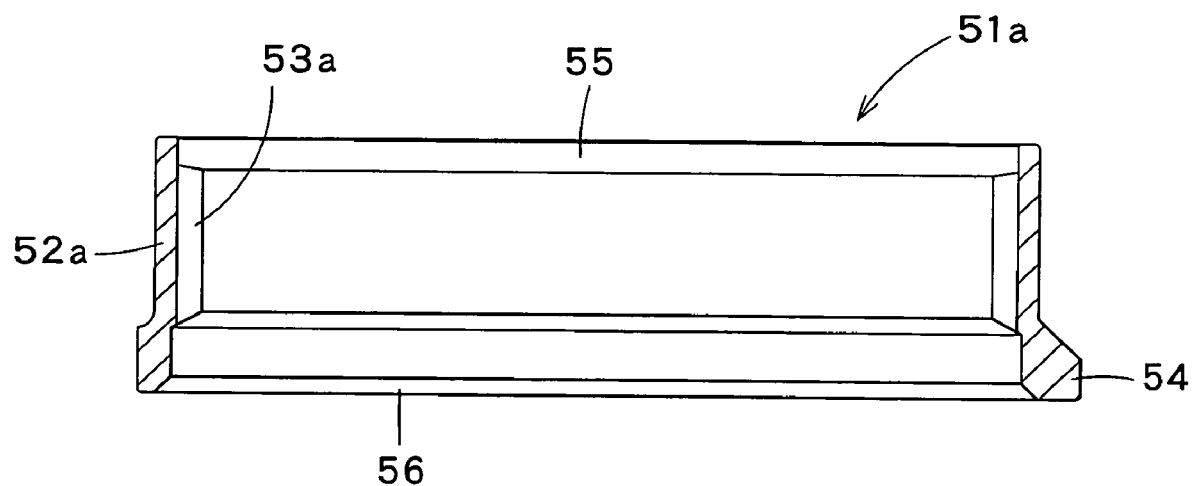
FIG. 2A is a sectional front view of a preformed gear (internal gear) before a tooth trace thereof is adjusted in accordance with an embodiment of the present invention.
Figure 2B:
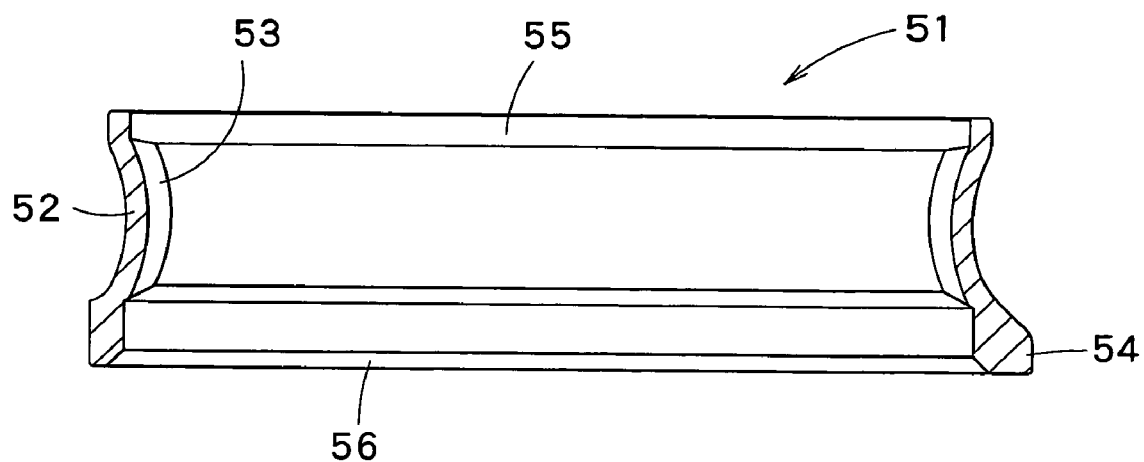
FIG. 2B is a sectional front view of an internal gear after a tooth trace thereof has been adjusted in accordance with the embodiment of the present invention.

At first, as shown in FIG. 2A, the preformed gear 51a is prepared, in which a preformed tooth part 53a having a flat tooth flank of a uniform thickness in the tooth trace direction has been formed. Then, an end portion of the preformed gear 51a on the side of the large opening 56 is brought into contact with the contact end 7 of the positioning tool 6 so as to be positioned. Under that situation, an outside surface of a preformed main body 52a of the preformed gear 51a on the side of the large opening 56 is held by the chuck members 4.

Then, as shown in FIG. 5, the electron-beam gun 2 is positioned at a position corresponding to a substantially center in the tooth trace direction of the preformed tooth part 53a of the preformed gear 51a. Under that situation, the holding tool 3 starts to rotate. Thus, the preformed gear 51a held by the chuck members 4 also rotates together with the holding tool 3. At the same time, the electron-beam gun 2 starts to irradiate an electron beam to the outside surface of the preformed gear 51a. Thus, the outside surface of the preformed gear 51a receives the electron beam circumferentially, and hence the portion receiving the electron beam is distorted because of surface modification thereof. Thus, the outside surface of the preformed main body 52a is deformed to be dented in a circular arc in the tooth trace direction. Thus, the central portion(s) of the preformed tooth part(s) 53a in the tooth trace direction is deformed to bulge inwardly.

Figure 3A:
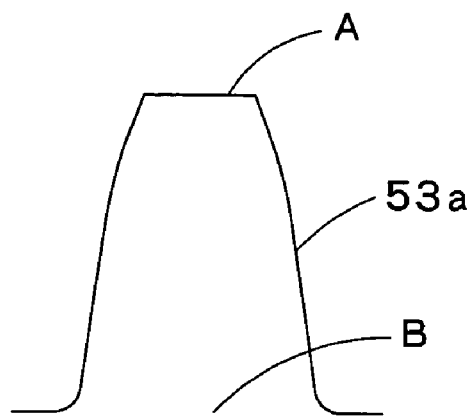
FIG. 3A is a sectional view of a tooth part of an internal gear formed by the embodiment of the present invention.
Figure 3B:
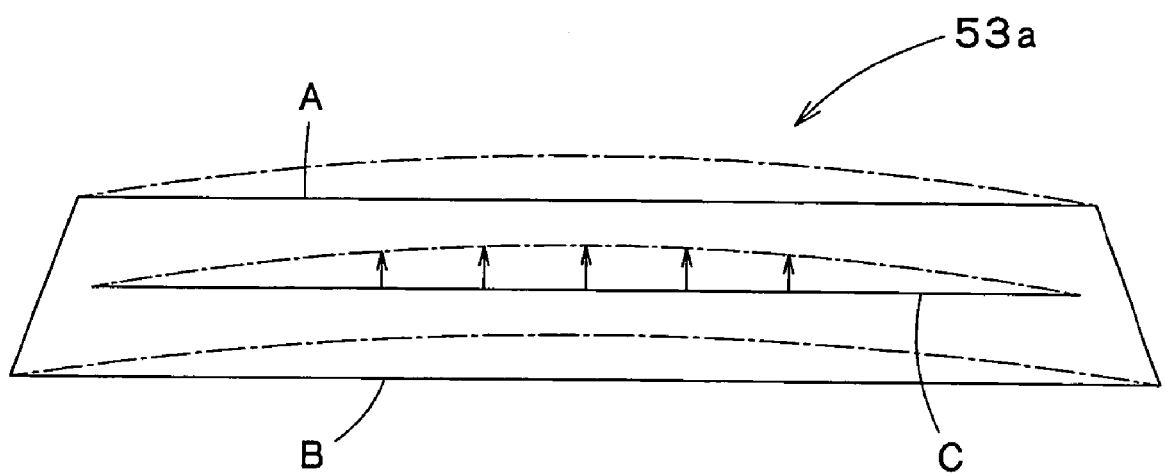
FIG. 3B is an explanatory view of the deformation state of the tooth part of the internal gear formed by the embodiment of the present invention.
Figure 4A:
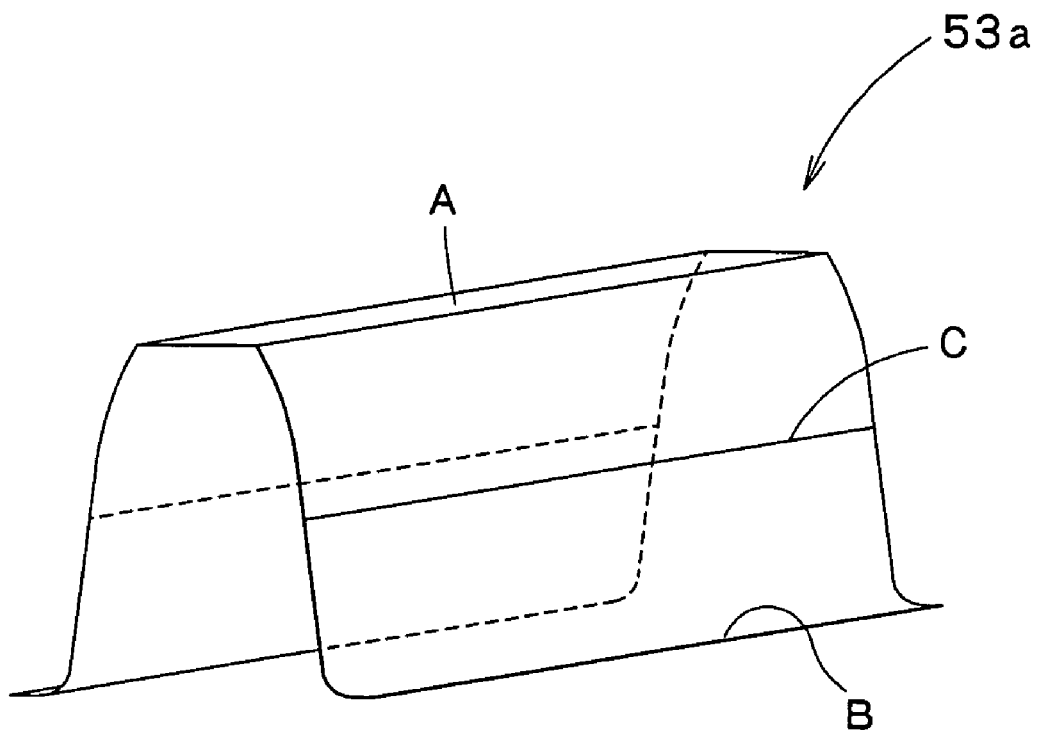
FIG. 4A is a perspective view of a preformed gear before a tooth trace thereof is adjusted in accordance with the embodiment of the present invention.
Figure 4B:
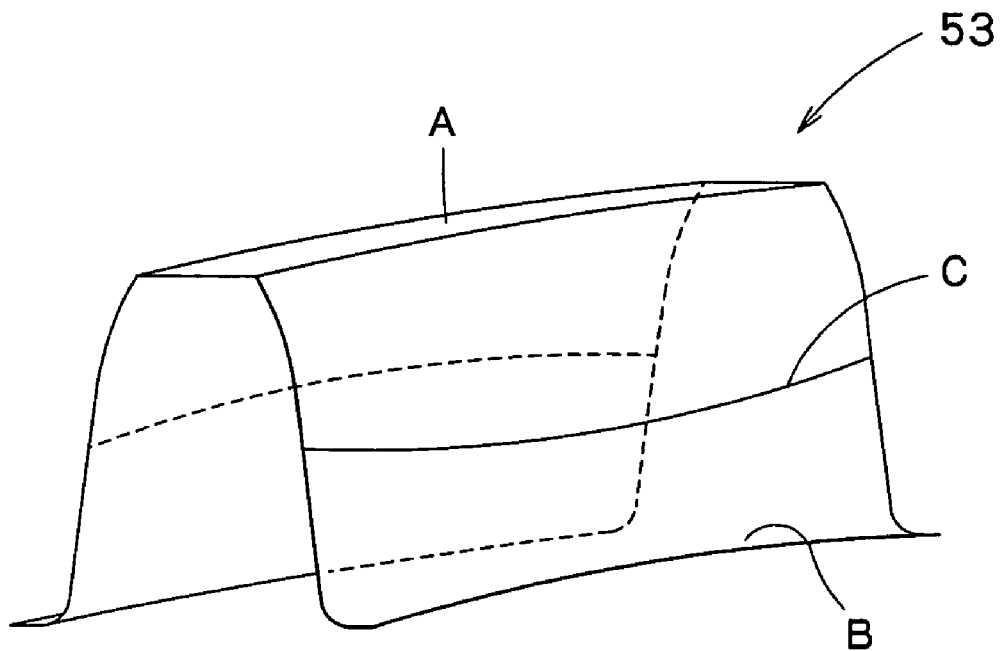
FIG. 4B is a perspective view of an internal gear after a tooth trace thereof has been adjusted in accordance with the embodiment of the present invention.

Herein, as shown in FIG. 3A, the preformed tooth part 53a of the preformed gear 51a is formed in a substantially saddle-back shape tapering from a tooth bottom portion B to a tooth tip portion A. In the preformed gear 51a, as described above, when the outside surface of the preformed main body 52a is deformed to be dented inwardly, the tooth tip portion A at the substantially central portion of the preformed tooth part 53a in the tooth trace direction protrudes inwardly, as shown in FIG. 3B. Thereby, from both ends of the preformed tooth part 53a to the substantially central portion in the tooth trace direction, the position of the tooth bottom portion B having a large thickness is also moved inwardly. In addition, as shown in FIG. 4A, the tooth flank of the preformed tooth part 53a of the preformed gear 51a is flat and has a uniform thickness in the tooth trace direction before the electron beam is irradiated. However, since the portion receiving the electron beam is distorted because of surface modification thereof, as shown in FIG. 4B, a substantially central portion of a tooth-trace center line C extending in the tooth trace direction through the median between the tooth tip portion A and the tooth bottom portion B is deformed to bulge outwardly maximally. That is, a crowning is formed on the tooth flank of the preformed tooth part 53a, so that the desired tooth part 53 is formed.

Next, a second embodiment of the present invention is explained. Then, a preformed gear prepared for the second embodiment is substantially the same as the preformed gear 51a in the previous embodiment.

Figure 6:
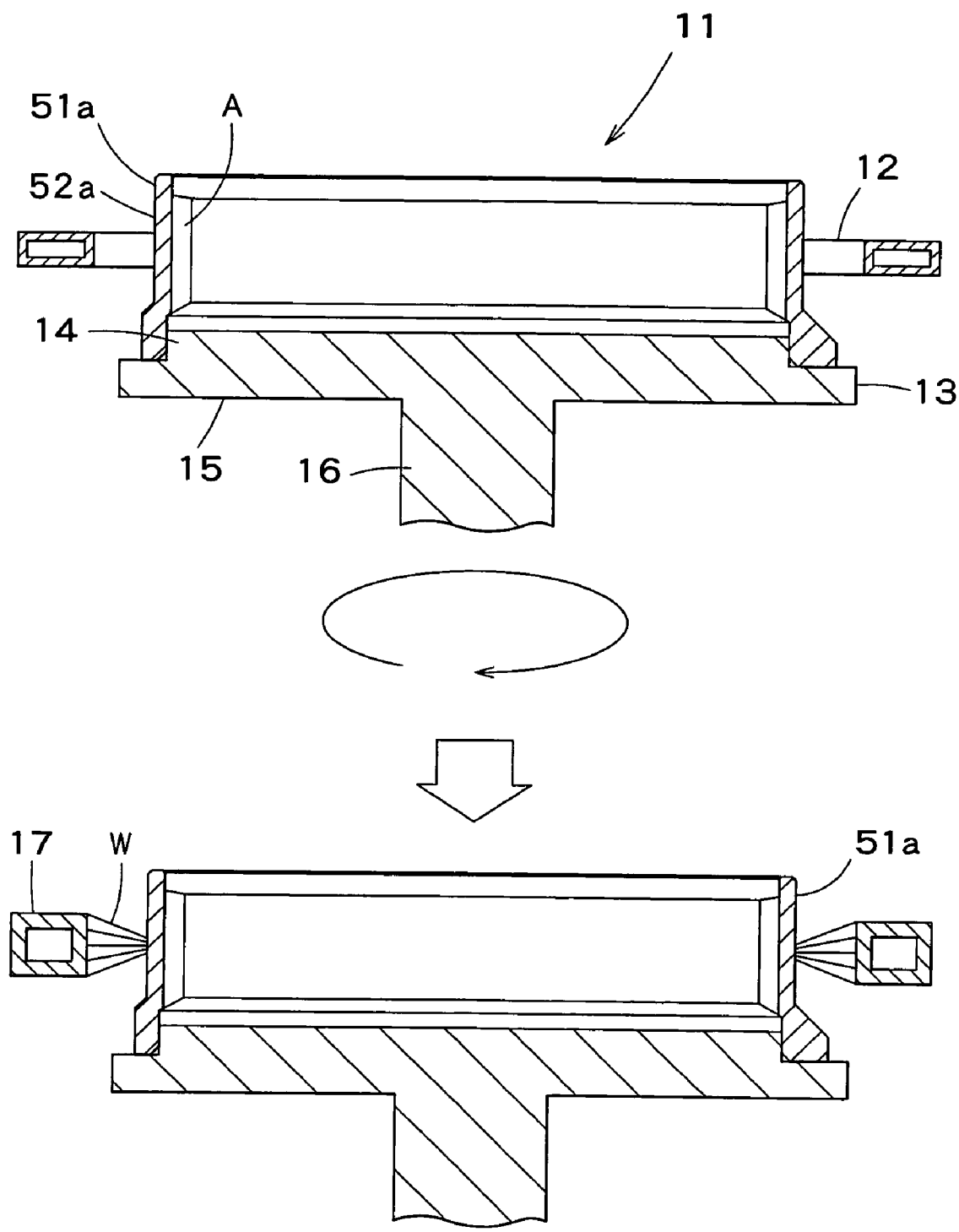
FIG. 6 is a partial sectional view showing a surface-treatment unit by means of an induction hardening process, used in a second embodiment of the present invention.

FIG. 6 shows an induction hardening unit 11 as a surface-treatment unit used in the second embodiment. The induction hardening unit 11 has a circular induction heating coil 12 and a supporting tool 13. The supporting tool 13 has a cylindrical part 14 whose diameter is substantially the same as the inside surface of the large opening 56 of the preformed main part 52a of the preformed gear 51a. A plate-like supporting part 15 extends serially from the cylindrical part 14. A shaft 16 protrudes from a surface of the supporting part 15 on a side opposite to the cylindrical part 14. The shaft 16 is connected to a controlling unit not shown.

A method of forming (adjusting) the tooth flank(s) of the tooth part(s) 53 of the internal gear 51 by using the induction hardening unit 11 is explained with reference to FIG. 6.

At first, as shown in FIG. 2A, the preformed gear 51a is prepared, in which the preformed tooth part 53a having the flat tooth flank of the uniform thickness in the tooth trace direction has been formed. Then, the cylindrical part 14 is inserted into the large opening 56 of the preformed gear 51a, and the end portion of the preformed gear 51a on the side of the large opening 56 is brought into contact with the supporting part 15. Thus, the preformed gear 51a is supported by the supporting tool 13.

Then, as shown in FIG. 6, the induction heating coil 12 is positioned concentrically with the preformed gear 51a, at a position corresponding to a substantially center in the tooth trace direction of the preformed tooth part 53a of the preformed gear 51a. Under that situation, the supporting tool 13 starts to rotate by means of the controlling unit not shown. Thus, the preformed gear 51a also rotates together with the supporting tool 13. At the same time, a high-frequency electric current is supplied to the induction heating coil 12, so that a circular portion corresponding to the substantially center(s) of the preformed tooth part(s) 53a of the preformed gear 51a in the tooth trace direction is heated. Just after that, a quenching liquid is ejected to the heated portion. After the heating process is completed, a cooling liquid W is ejected from a cooling unit 17 to the heated portion of the preformed gear 51a. Thus, the preformed gear 51a is cooled, and then the forming (adjusting) method of the tooth trace is completed. That is, the heated portion is distorted because of surface modification thereof, so that the outside surface of the preformed main body 52a is deformed to be dented in a circular arc in the tooth trace direction. Thus, the central portion of the preformed tooth part 53a in the tooth trace direction is deformed to bulge inwardly.

Thus, according to the second embodiment, similarly to the above embodiment, the outside surface of the preformed main body 52a is deformed to be dented inwardly, and the tooth tip portion A at the substantially central portion of the preformed tooth part 53a in the tooth trace direction protrudes inwardly, as shown in FIG. 3B. Thereby, from the both ends of the preformed tooth part 53a to the substantially central portion in the tooth trace direction, the position of the tooth bottom portion B having a large thickness is also moved inwardly. In addition, as shown in FIG. 4B, the substantially central portion of the tooth-trace center line C extending in the tooth trace direction through the median between the tooth tip portion A and the tooth bottom portion B is deformed to bulge outwardly maximally. That is, a crowning is formed on the tooth flank of the preformed tooth part 53a, so that the desired tooth part 53 is formed.

Next, a third embodiment of the present invention is explained. Then, in a preformed gear 51a' prepared for the third embodiment, no protrusion is formed on the outside periphery of the preformed main body 52a. However, the other structures of the preformed gear 51a' are substantially the same as the preformed gear 51a of the previous embodiments.

Figure 7:
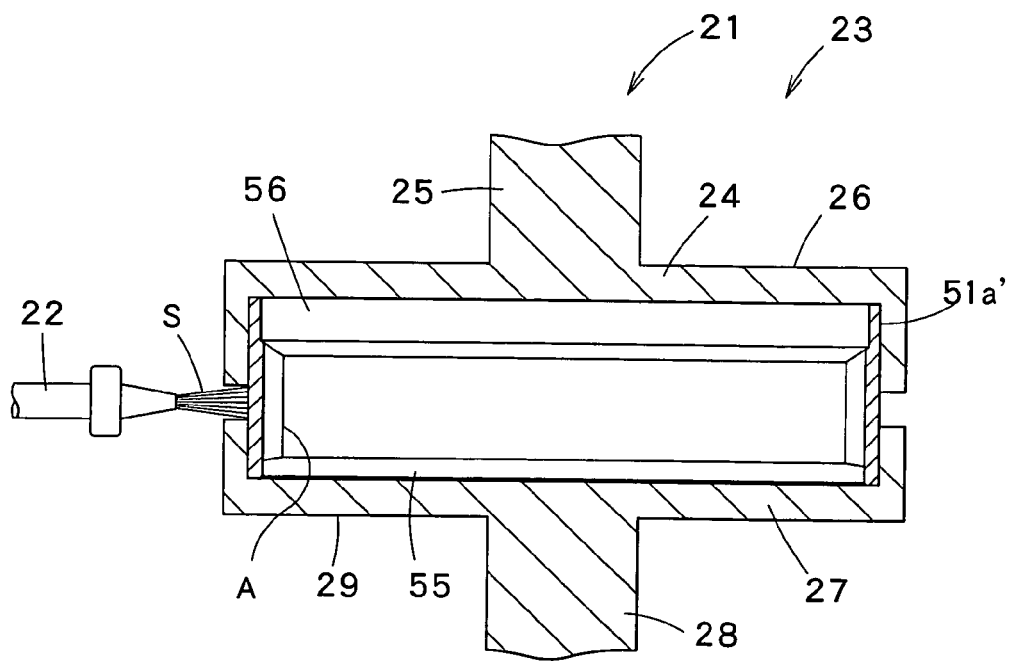
FIG. 7 is a partial sectional view showing a surface-treatment unit by means of a shot peening process, used in a third embodiment of the present invention.

FIG. 7 shows a shot peening unit 21 as a surface-treatment unit used in the third embodiment. The shot peening unit 21 has a nozzle head 22 and a supporting tool 23 for supporting the preformed gear 51a'. The supporting tool 23 has an upper cover 26 and a lower cover 29. The upper cover 26 has an upper cup portion 24 of a cup shape having an inside surface of substantially the same diameter as the outside surface of the preformed gear 51a' on the side of the large opening 56, and an upper shaft 25 extending upward from the upper cup portion 24. The lower cover 29 has a lower cup portion 27 of a cup shape having an inside surface of substantially the same diameter as the outside surface of the preformed gear 51a' on the side of the small opening 55, and a lower shaft 28 extending downward from the lower cup portion 27. The upper shaft 25 of the upper cover 26 and the lower shaft 28 of the lower cover 29 are connected to a controlling unit not shown. A predetermined gap is formed between the upper cover 26 and the lower cover 29, correspondingly to the substantially center of the preformed gear 51a' in the tooth trace direction. In addition, the shot nozzle 22 is connected to a shot conveying hose not shown.

A method of forming (adjusting) the tooth flank(s) of the tooth part(s) 53 of the internal gear 51 by using the shot peening unit 21 is explained with reference to FIG. 7.

At first, as shown in FIG. 2A, the preformed gear 51a' is prepared, in which the preformed tooth part 53a having the flat tooth flank of the uniform thickness in the tooth trace direction has been formed. Then, the preformed gear 51a' is inserted into the lower cup portion 27 of the lower cover 29. Thus, substantially a half of the preformed gear 51a' on the side of the small opening 55 is covered by the lower cup portion 27. Then, the upper cover 26 is placed on the preformed gear 51a', so that substantially a half of the preformed gear 51a' on the side of the large opening 56 is covered by the upper cup portion 24. Thus, the preformed gear 51a' is supported by the upper cover 26 and the lower cover 29. Under that situation, rotation of the upper cover 26 and the lower cover 29 is started by the controlling unit. Thus, the preformed gear 51a' also rotates. At the same time, a shot S is supplied to the shot nozzle 22 through the conveying hose, and then the shot S is ejected from the shot nozzle 22 to the preformed gear 51a'. The shot S passes through the gap between the upper cover 26 and the lower cover 29 and hits the preformed gear 51a'. The portion hit by the shot S is distorted because of a local compression stress. Concretely, the outside surface of the preformed main body 52a of the preformed gear 51a' is deformed to be dented in a circular arc in the tooth trace direction. Thus, the central portion of the preformed tooth part 53a in the tooth trace direction is deformed to bulge inwardly.

Thus, according to the third embodiment, similarly to the above two embodiments, the outside surface of the preformed main body 52a is deformed to be dented inwardly, and the tooth tip portion A at the substantially central portion of the preformed tooth part 53a in the tooth trace direction protrudes inwardly, as shown in FIG. 3B. Thereby, from the both ends of the preformed tooth part 53a to the substantially central portion in the tooth trace direction, the position of the tooth bottom portion B having a large thickness is also moved inwardly. In addition, as shown in FIG. 4B, the substantially central portion of the tooth-trace center line C extending in the tooth trace direction through the median between the tooth tip portion A and the tooth bottom portion B is deformed to bulge outwardly maximally. That is, a crowning is formed on the tooth flank of the preformed tooth part 53a, so that the desired tooth part 53 is formed.

As a surface-treatment unit, a unit using a laser-beam may be used to form (adjust) the tooth trace(s) of the tooth part(s) of the internal gear, as well as the case of the electron beam.

As a surface-treatment unit, each unit using an electron beam, a laser beam, an induction hardening process or a shot peening process has been explained. However, the surface-treatment unit is not limited thereto. The surface-treatment unit may be any other unit for generating distortion by means of various surface modifications, compression stresses, and so on, as far as it can deform the outside surface of the internal gear in such a manner that the same is dented inwardly in a circular arc.

In addition, in the above embodiments, the central portion of the tooth part of the internal gear in the tooth trace direction bulges to form the crowning. However, the bulging portion is not limited to the central portion in the tooth trace direction. The bulging portion is suitably changeable depending on an object and/or an application.

Furthermore, if a size and/or a depth of the distortion caused by the surface-treatment unit is changed, a size and/or a shape of the circular arc dented inwardly on the outside surface of the internal gear may be changed accordingly. Thus, a size and/or a shape of the crowning may be changed.

In addition, the concept of the present invention can be applied to an external gear as well as the internal gear. For example, it can be also applied to an external gear wherein a tooth part is formed on an outside surface of a cylindrical main body.

Figure 8A:
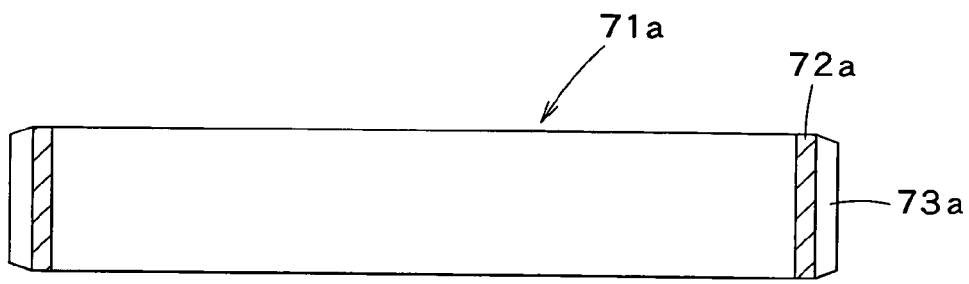
FIG. 8A is a sectional front view of a preformed gear (external gear) before a tooth trace thereof is adjusted in accordance with an embodiment of the present invention.
Figure 8B:
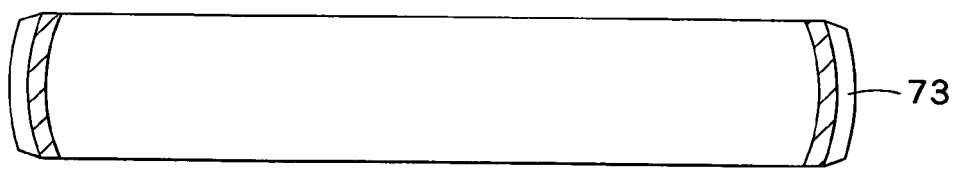
FIG. 8B is a sectional front view of an external gear after a tooth trace thereof has been adjusted in accordance with the embodiment of the present invention.
Figure 9:
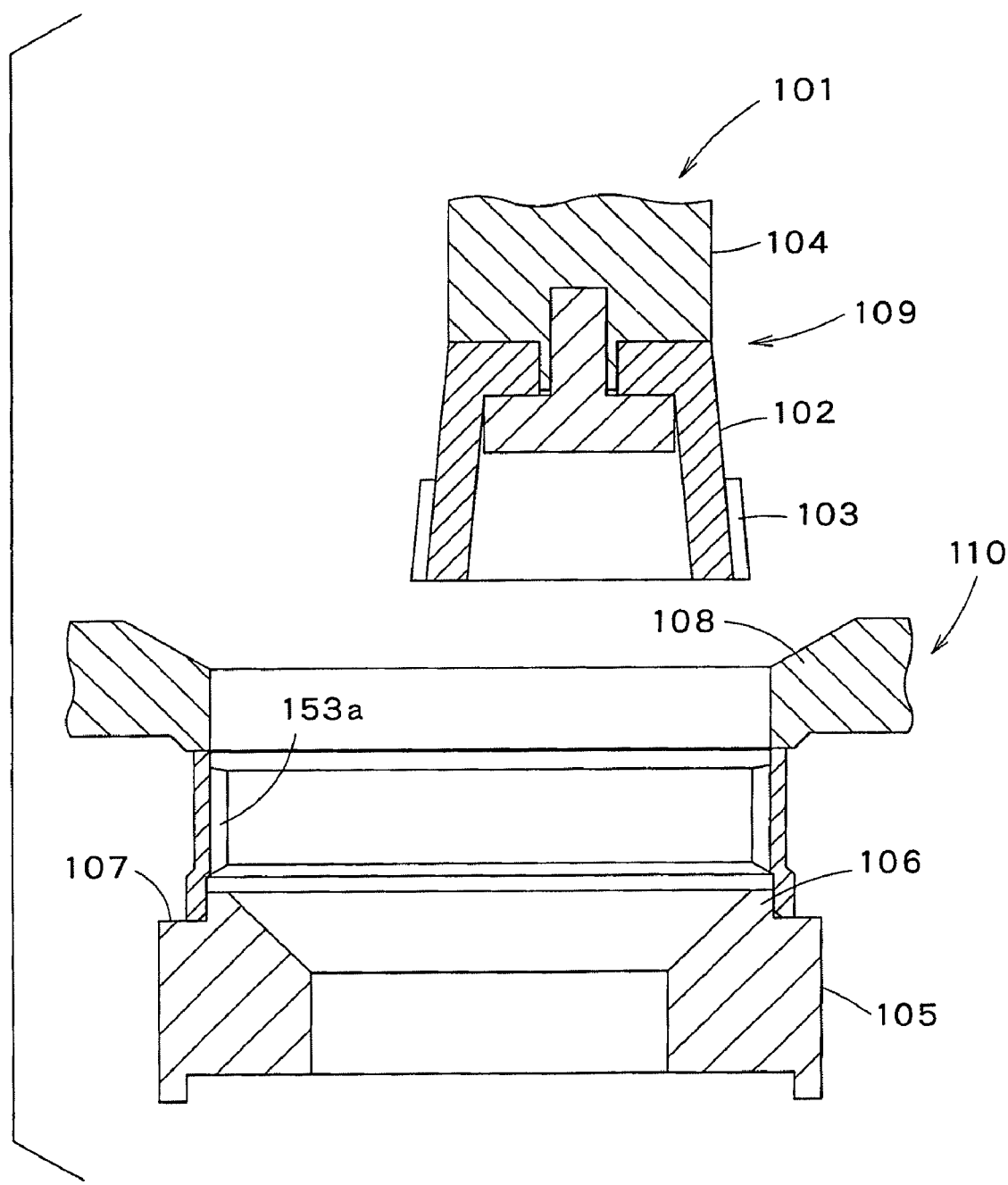
FIG. 9 is a partial sectional front view showing a conventional cutting unit.

FIG. 8A shows a preformed gear 71a in which a preformed tooth part 73a having a flat tooth flank of a uniform thickness in the tooth trace direction has been formed. Then, correspondingly to substantially a center in the tooth trace direction of the preformed tooth part 73a of the preformed gear 71a, from an inside of the preformed main body 72a of the preformed gear 71a, a surface treatment is conducted using an electron beam, a laser beam, an induction hardening process or a shot peening process. Thus, the inside surface of the preformed gear 71a is deformed to be dented outwardly, and a tooth tip portion at the substantially central portion of the preformed tooth part 73a in the tooth trace direction protrudes outwardly. Thereby, from both ends of the preformed tooth part 73a to the substantially central portion in the tooth trace direction, the position of a tooth bottom portion having a large thickness is also moved outwardly. In addition, a substantially central portion of a tooth-trace center line extending in the tooth trace direction through the median between the tooth tip portion and the tooth bottom portion is deformed to bulge outwardly maximally. That is, a crowning is formed on the tooth flank of the preformed tooth part 73a, so that the desired tooth part 73 is formed (see FIG. 8B).

The invention claimed is:

1. A forming method of a tooth trace of a gear, comprising
a first step of preparing a preformed gear made of metal including a cylindrical main body and a tooth part having a flat tooth flank having a uniform thickness in a tooth trace direction inside the main body, and
a second step of conducting a surface treatment locally to an outside surface of the main body under an unrestrained state of the tooth part in order to deform the outside surface of the main body in such a manner that the same becomes concave, so that the tooth part inwardly protrudes at a tooth tip portion thereof, and a crowning bulging in the tooth trace direction is formed on a portion of the tooth flank of the tooth part without the aid of a forming surface.

2. A forming method of a tooth trace of a gear according to claim 1, wherein
in the second step, the surface treatment is conducted to a portion of the outside surface of the main body corresponding to a central portion in the tooth trace direction of the tooth part.

3. A forming method of a tooth trace of a gear according to claim 1, wherein
the surface treatment is conducted by using a laser beam.

4. A forming method of a tooth trace of a gear according to claim 1, wherein
the surface treatment is conducted by using an electron beam.

5. A forming method of a tooth trace of a gear according to claim 1, wherein
the surface treatment is conducted by an induction hardening process.

6. A forming method of a tooth trace of a gear according to claim 1, wherein
the surface treatment is conducted by a shot peening process.

7. A forming method of a tooth trace of a gear, comprising
a first step of preparing a preformed gear made of metal including a cylindrical main body and a tooth part having a flat tooth flank having a uniform thickness in a tooth trace direction outside the main body, and
a second step of conducting a surface treatment locally to an inside surface of the main body under an unrestrained state of the tooth part in order to deform the inside surface of the main body in such a manner that the same becomes concave, so that the tooth part outwardly protrudes at a tooth tip portion thereof, and a crowning bulging in the tooth trace direction is formed on a portion of the tooth flank of the tooth part without the aid of a forming surface.

8. A forming method of a tooth trace of a gear according to claim 7, wherein
in the second step, the surface treatment is conducted to a portion of the inside surface of the main body corresponding to a central portion in the tooth trace direction of the tooth part.

9. A forming method of a tooth trace of a gear according to claim 7, wherein
the surface treatment is conducted by using a laser beam.

10. A forming method of a tooth trace of a gear according to claim 7, wherein
the surface treatment is conducted by using an electron beam.

11. A forming method of a tooth trace of a gear according to claim 7, wherein the surface treatment is conducted by an induction hardening process.

12. A forming method of a tooth trace of a gear according to claim 7, wherein the surface treatment is conducted by a shot peening process.

* * * * *